United States Patent
Takahashi

[11] Patent Number: 5,601,246
[45] Date of Patent: Feb. 11, 1997

[54] ADJUSTABLE THUMB PLACEMENT MEMBER FOR A FISHING REEL

[75] Inventor: Hideaki Takahashi, Tokyo, Japan

[73] Assignee: Daiwa Seiko, Inc., Tokyo, Japan

[21] Appl. No.: 391,350

[22] Filed: Feb. 21, 1995

[30]  Foreign Application Priority Data

Feb. 22, 1994 [JP] Japan ................... 6-047919

[51] Int. Cl.⁶ ................................................ A01K 89/015
[52] U.S. Cl. ................................................ 242/261; 242/310
[58] Field of Search ................... 242/259, 260, 242/261, 310

[56]  References Cited

U.S. PATENT DOCUMENTS

| | | | |
|---|---|---|---|
| 4,142,694 | 3/1979 | Rankin, Jr. | 242/260 |
| 4,819,893 | 4/1989 | Ueno | 242/310 X |
| 4,919,360 | 4/1990 | Roberts | 242/260 |
| 5,188,312 | 2/1993 | Sato | 242/261 |
| 5,305,967 | 4/1994 | Sato | 242/261 |

FOREIGN PATENT DOCUMENTS 4-21262  2/1992  Japan .
4-4533   2/1992  Japan .

Primary Examiner—Katherine Matecki
Assistant Examiner—William A. Rivera
Attorney, Agent, or Firm—Longacre & White

[57]  ABSTRACT

A fishing reel which allows anglers to perform a reasonable spool operation according to the sizes of their hands and according to the their tastes to thereby enjoy fishing under the optimum condition. In the portions of right and left side frames provided in a reel main body respectively existing in the rear portion of the reel main body, there are formed elongated holes into which projecting portions provided in the two sides of a thumb placement member are movably inserted, respectively. A pin provided in the projecting portion of the thumb placement member is inserted into an elongated hole formed in a clutch lever of a clutch operating member, so that the thumb placement member is connected to the clutch operating member. The thumb placement member is formed U-shaped and includes a plurality of engaging portions each consisting of a pair of recessed portions formed in such a manner that a thumb placing portion of the thumb placement member can be changed in position in the vertical direction of the reel main body. A spool is rotatably supported between the two side frames.

12 Claims, 13 Drawing Sheets

5,601,246

ADJUSTABLE THUMB PLACEMENT MEMBER FOR A FISHING REEL

BACKGROUND OF THE INVENTION

The present invention relates to a fishing reel having a thumb placement member disposed in a portion of a reel main body at the rear of a spool for receiving a thumb of an angler, and in particular to an improvement for such reel, in which the height of the thumb placement member can be changed in the vertical direction of the reel main body.

Conventionally, in order to facilitate a thumbing operation when a fishline is played out or to facilitate holding of a reel during the awaiting a bite of fish or when fitting the reel to the movements of fish, a thumb placement member on which a thumb can be put is generally provided between side plates of a reel main body provided in the rear of a spool, as disclosed in Japanese Utility Model Kokoku Publication No. Hei. 4-4533, Japanese Utility Model Kokai Publication No. Hei. 4-21262, and the like.

However, actually, the winding diameters of fishlines to be wound around the spool and the winding amounts thereof can vary according to cases, and also the hands of anglers vary in size individually. Further, some anglers prefer to apply their thumbs to the flange of the spool, while others like to apply their thumbs to the outer periphery of the fishline wound around the spool.

In the above-mentioned case, the thumb placement member, the height position of which is regulated to a fixed level, cannot deal with difference among individual anglers and thus the anglers are not always able to enjoy fishing under ideal conditions.

In other words, for example, while the winding amounts of a fishline wound around the spool are small, the thumbing operation must be performed on the outer periphery of such fishline; or, the thumb placement member is too high or low in height for the thumb of a hand holding the reel to be put thereon. In these cases, the thumbing operation cannot be performed delicately and thus it is not possible to prevent a backlash phenomenon positively and easily.

Also, the reel cannot be held sufficiently during the waiting time or during the fish movement chasing operation and thus the angler has to handle the reel unstably and unreasonably. When such unstable and unreasonable reel holding lasts long, then the hand holding the reel will be badly tired. That is, the angler is not able to play fishing in pleasant and stable conditions.

As described above, the conventional thumb placement member, the height position of which is regulated to a fixed level, is not able to deal with differences among individual anglers and thus the anglers are not able to play fishing under the optimum conditions.

Also, the anglers are not able to hold the reel sufficiently during the waiting time or during the fish motion chasing operation or hooking operation, and thus the anglers have to operate the reel holding hand unstably and unreasonably. When such unstable and unreasonable reel holding lasts long, then the holding hand will be badly tired. That is, the anglers are not able to play fishing in pleasant and stable conditions.

SUMMARY OF THE INVENTION

The present invention aims at eliminating the drawbacks found in the above-mentioned conventional fishing reels. Accordingly, it is an object of the invention to provide a fishing reel which is capable of performing a spool operation according to the sizes of anglers hands or according to the tastes of the anglers to thereby allow the anglers to play fishing under the optimum conditions, and, in a long time of fishing, is also capable of performing a fishing operation under the pleasant and stable conditions.

In order to attain the above object, the invention provides, as an embodiment thereof, a fishing reel in which a thumb placement member for a thumb to be placeable thereon is provided in a portion of a reel main body at a rear of a spool supported rotatably between two side plates of the reel main body in such a manner that not only the thumb placement member is connected with a clutch mechanism switchable from the spool free state thereof to the winding state thereof and vice versa and but also can be moved from the upper position thereof to the lower position thereof, and the clutch mechanism can be switched from the winding state thereof to the spool free state thereof by means of the downward movement of the thumb placement member. The thumb placement member connected to the clutch mechanism includes a thumb placing portion which makes it possible to change the mounting position of the thumb placement member in the vertical direction of the reel main body.

The invention further provides, as another embodiment thereof, a fishing reel in which a spool is rotatably supported between two side plates of a reel main body, and which is characterized in that, in a portion of the reel main body existing at a rear of the spool, there is disposed a thumb placement member for a thumb to be placeable thereon in such a manner that the mounting position of the thumb placement member can be changed in the vertical direction of the reel main body.

In FIG. 7, a thumb placing portion 16 is secured to a pair of recessed portions 5c located at the upper-most stage in a thumb placement member 5.

If the thumb of a hand holding a fishing rod 37 is put on the thumb placing portion 16 of the thumb placement member 5, then the thumb placement member 5 is pressed down as shown in FIG. 8.

If the thumb placement member 5 is pressed down, then the thumb is applied to the flange portion 3b of a spool 3 to thereby perform a thumbing operation in the play-out operation of a fishline 15.

When an angler likes to apply the thumb to the outer periphery of the fishline 15 wound around the spool, the thumb placing portion 16 may be secured to a pair of recessed portions 5d formed at the middle stage in the thumb placement member 5 and the thumb may be put on the thumb placing portion 16.

In other words, the thumb placing portion 16 may be secured by selecting the securing position thereof from three pairs of recessed portions 5c, 5d and 5e according to the sizes of anglers' hands or according to the winding diameters or winding amounts of the fishline 15 to be wound around the spool 3.

DETAILED DESCRIPTION OF THE PREFERRED EMBODIMENTS

Figure 1:
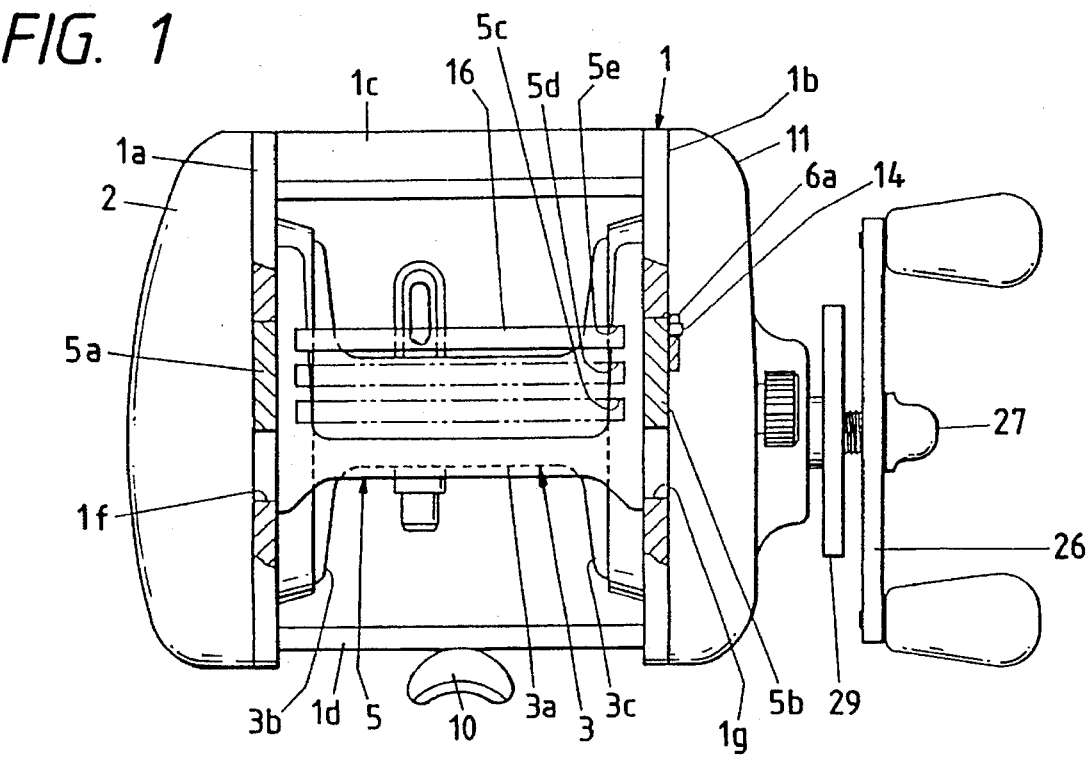
FIG. 1 is a sectional back view of the main portions of a fishing reel according to the first embodiment of the invention.
Figure 4:
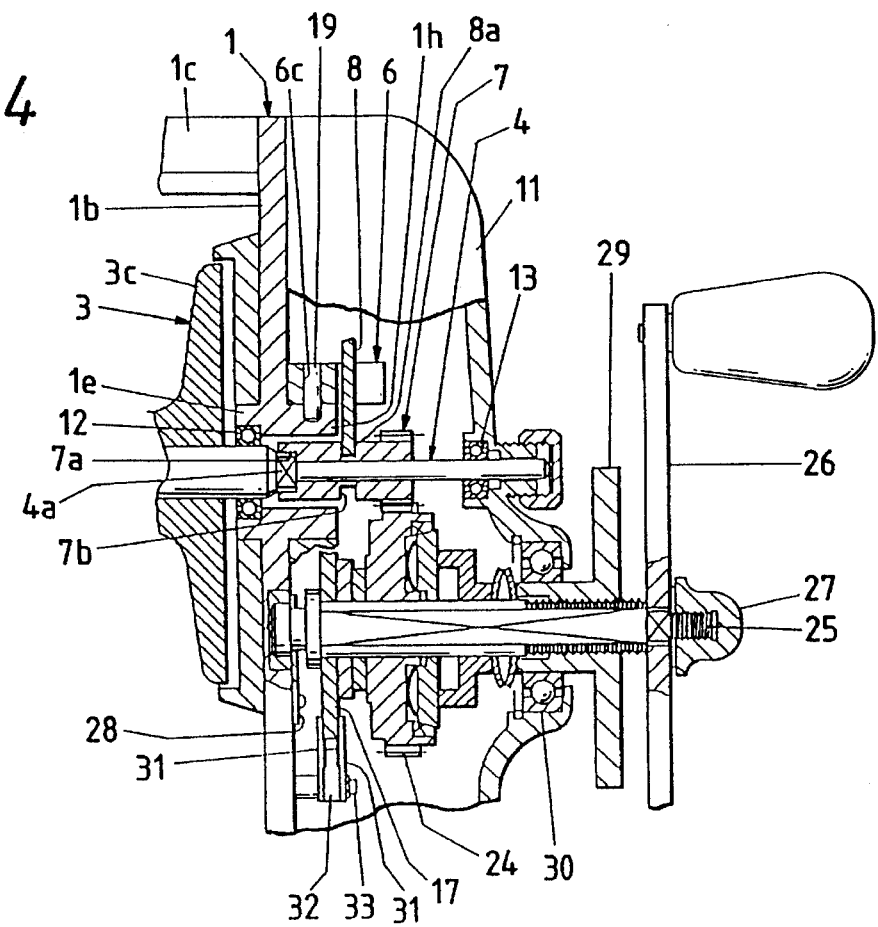
FIG. 4 is an enlarged sectional plan view of the main portions of the above fishing reel.
Figure 2:
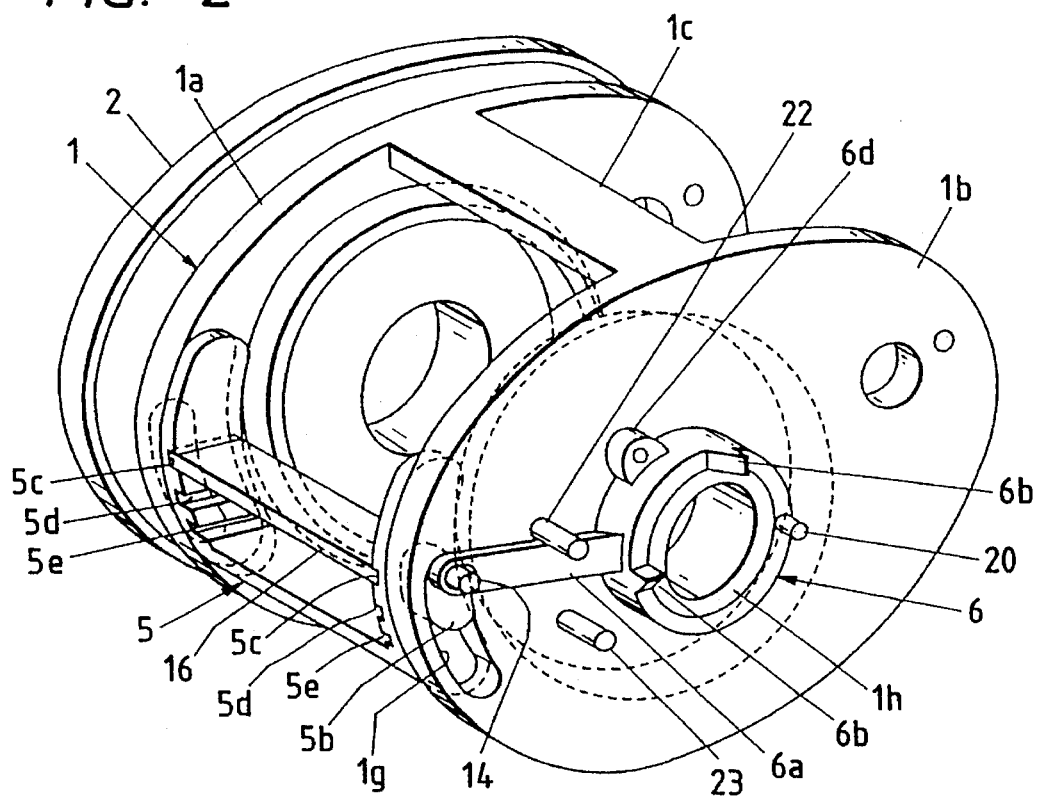
FIG. 2 is a right perspective view of a reel main body of the above fishing reel, with a thumb placement member connected to the right and left side frames of the reel main body as well as to a clutch operating member.
Figure 3:
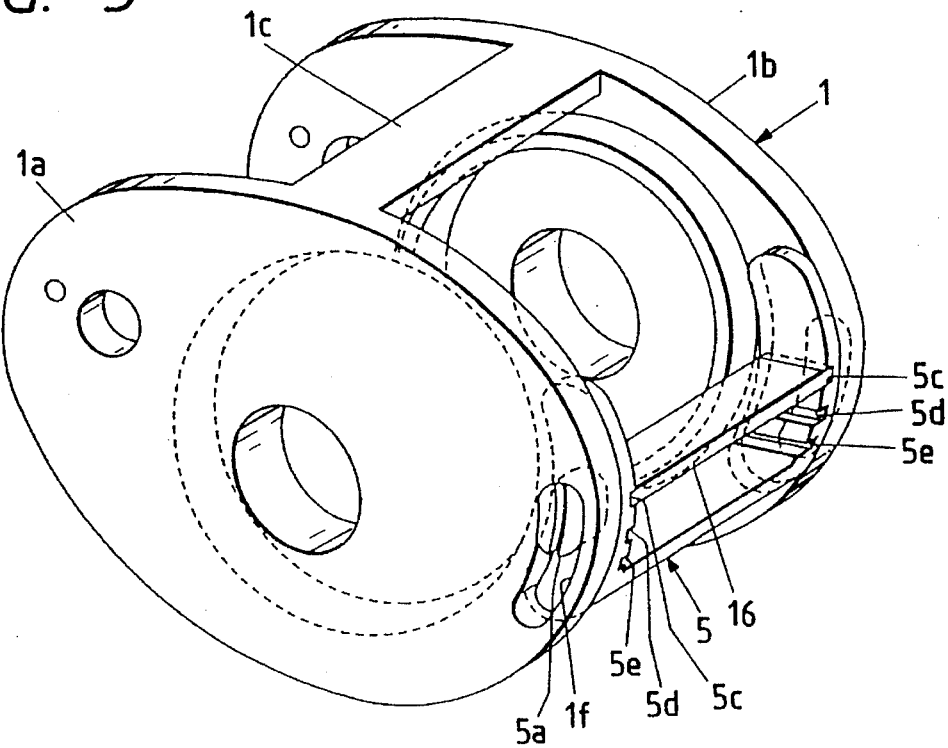
FIG. 3 is a left perspective view of the above reel main body, with the thumb placement member connected to the right and left side frames as well as to the clutch operating member.
Figure 5:
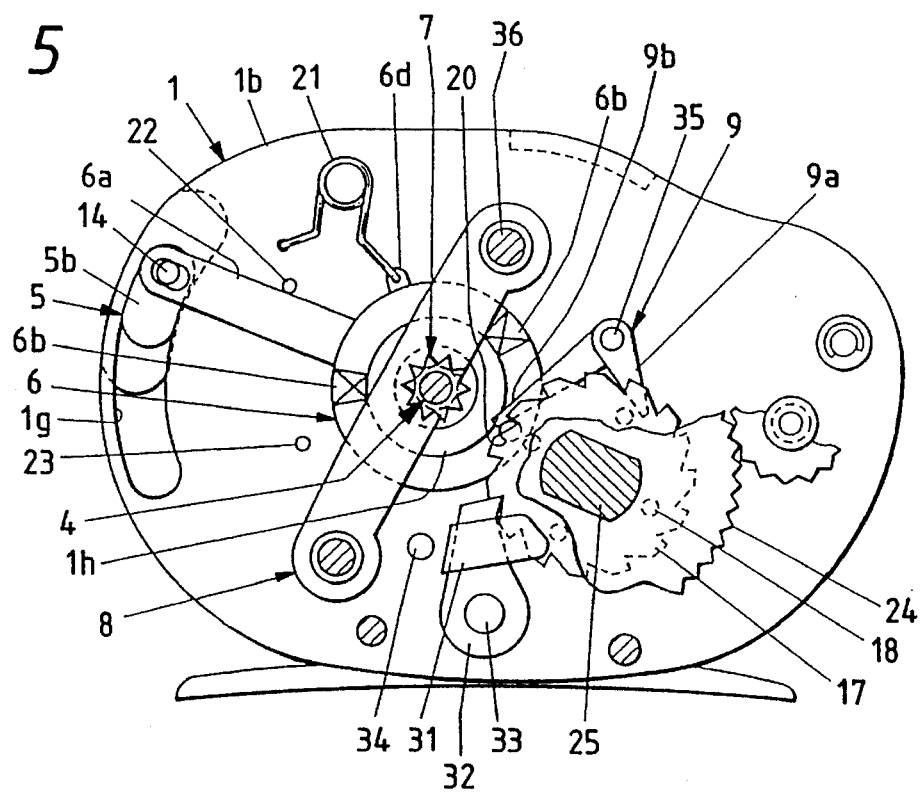
FIG. 5 is a sectional side view of the main portions of the above reel main body, showing the clutch-on state of a clutch mechanism provided in the right frame of the reel main body.
Figure 6:
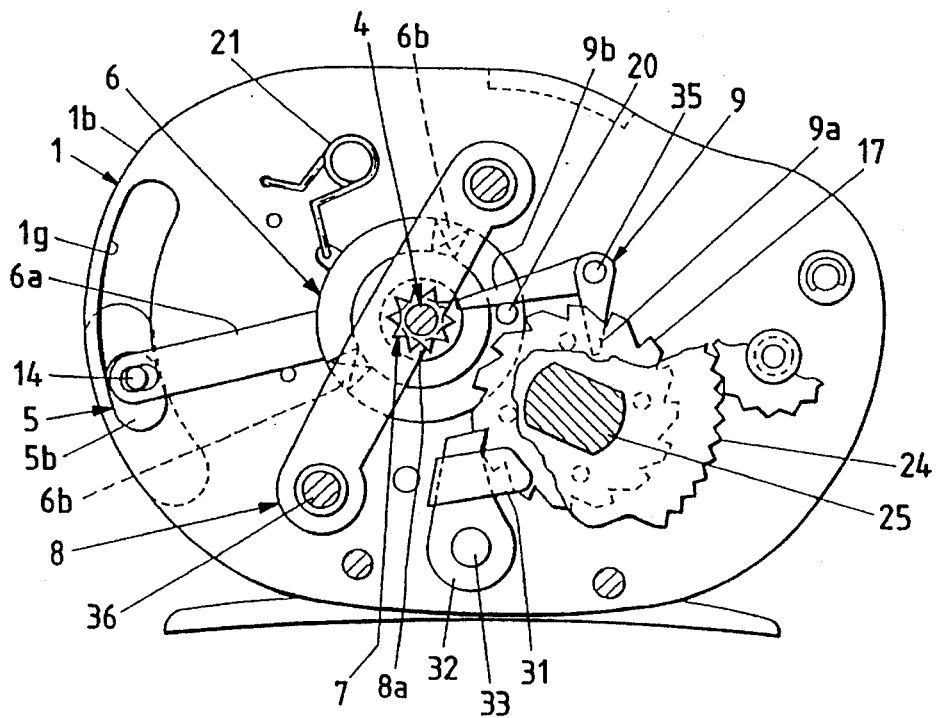
FIG. 6 is a sectional side view of the main portions of the above reel main body, showing the clutch-off state of the clutch mechanism in the right frame.
Figure 7:
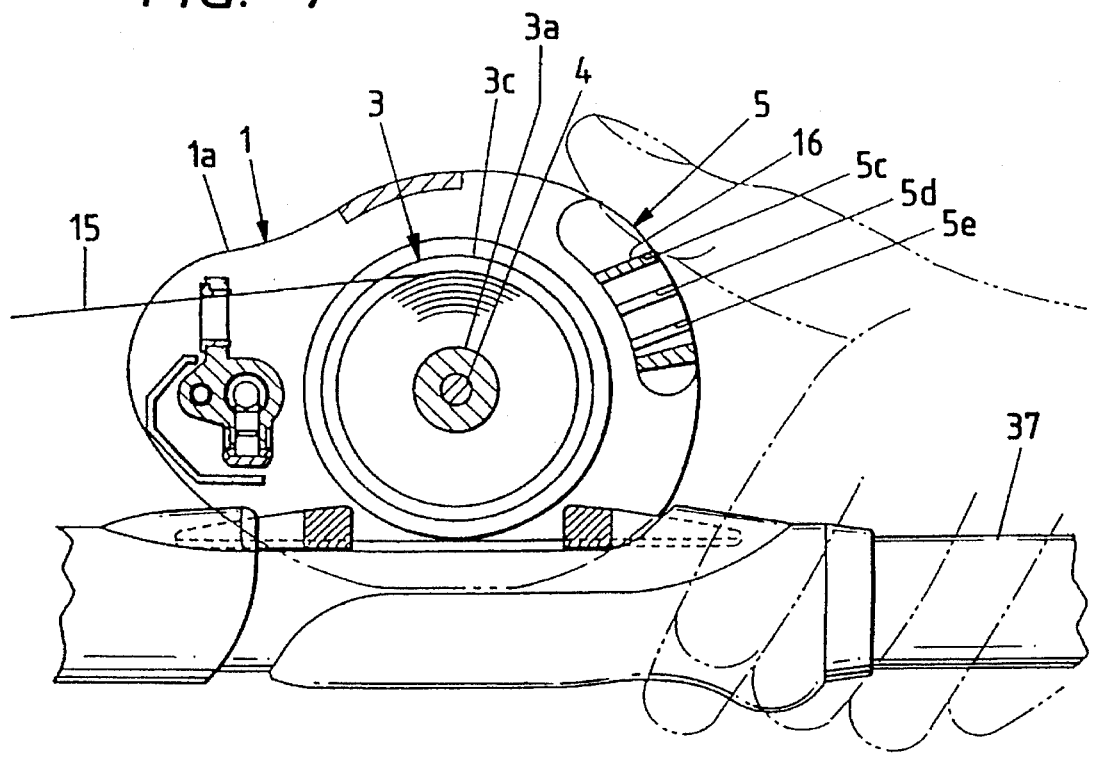
FIG. 7 is a sectional side view of the main portions of the above fishing reel, showing the clutch-on state thereof.
Figure 8:
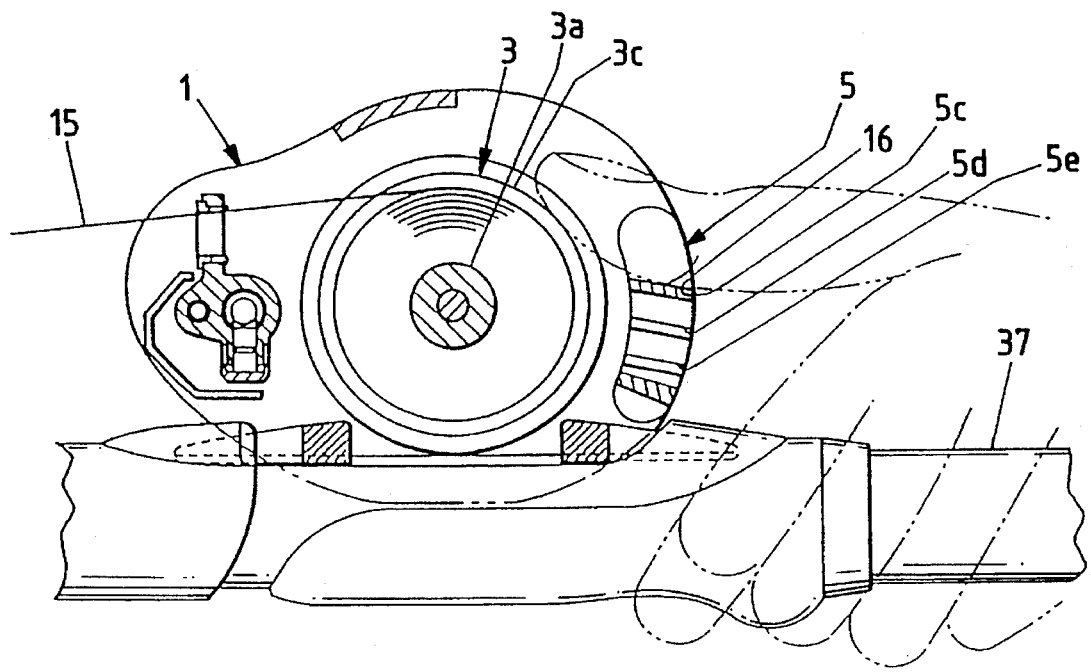
FIG. 8 is a sectional side view of the main portions of the above fishing reel, showing the clutch-off state thereof.

Now, description will be given hereinbelow of the invention by means of the embodiments thereof respectively shown in the accompanying drawings. In FIGS. 1 to 8, there is shown a first embodiment of a fishing reel according to the invention. In particular, FIG. 1 is a sectional back view of the main portions of a fishing reel according to the first embodiment, FIG. 2 is a right perspective view of the fishing reel, in which a thumb placement member is connected with the right and left side frames of a reel main body as well as with a clutch operating member, FIG. 3 is a left perspective view of the fishing reel, in which the thumb placement member is connected with the right and left frames of the reel main body as well as with the clutch operating member, FIG. 4 is an enlarged sectional plan view of the main portions of the fishing reel, FIG. 5 is a sectional side view of the main portions of the fishing reel, showing a state in which the clutch mechanism of the right frame of the reel main body is in the clutch-on state thereof, FIG. 6 is a sectional side view of the main portions of the fishing reel, showing a state in which the clutch mechanism of the right frame of the reel main body is in the clutch-off state thereof, FIG. 7 is a sectional side view of the main portions of the fishing reel, when the fishing reel is in the clutch-on state thereof, and FIG. 8 is a sectional side view of the main portions of the fishing reel, when the fishing reel is in the clutch-off state thereof.

In the present fishing reel, the right and left side frames 1a, 1b, a prop 1c, and a fixing plate 1d on which a reel leg 10 of the reel main body 1 is fixed are formed integrally with one another, and the right and left side frames 1a and 1b are held in parallel to each other.

Reel side plates 2, 11 are respectively mounted to the outsides of the right and left side frames 1a and 1b.

A spool 3 is rotatably supported between the two side frames 1a and 1b, and a spool shaft 4 fixed to the spool 3 is supported by one bearing (not shown) and by the other bearings 12, 13 in such a manner that it can be rotated.

The bearing 12 is mounted within a cylindrical portion 1e of the side frame 1b, while the bearing 13 is mounted on the reel side plate 11.

In the rear portions of the right and left side frames 1a and 1b of the reel main body 1, there are opened up elongated holes 1f and 1g into which projecting portions 5a and 5b respectively provided in a thumb placement member 5 are movably inserted.

A pin 14 provided in the projecting portion 5b of the thumb placement member 5 is inserted into and connected with an elongated hole formed in a clutch lever 6a which is disposed in a clutch operating member 6.

The spool 3 includes a winding barrel portion 3a and a pair of flange portions 3b, 3c, while a fishline 15 is wound around the winding barrel portion 3a.

The thumb placement member 5 is formed into a U-shape and includes in the two side portions thereof a plurality of engaging portions 5c, 5d and 5e each consisting of a pair of recessed portions, in such a manner that each pair of the engaging portions 5c, 5d and 5e can receive a thumb placing portion 16 so that the position of a thumb placing portion 16 can be changed in the vertical direction of the reel main body 1.

The interior of the reel side plate 11 is structured as a gear box for storing therein a clutch mechanism to be operated by the clutch operating member 6.

The clutch mechanism includes an engaging portion 7a provided in a pinion 7 engageable with and disengageable from the engaging portion 4a of a spool shaft 4, clutch cams 6b, 6b to be rotated by the clutch operating member 6, a clutch plate 8, a plurality of kick pins 18 provided in a ratchet wheel 17, and a kick lever 9, all of which will be described later.

The side frame 1b includes a cylindrical portion 1h which is projected outwardly of the side frame 1b. As can be seen from FIGS. 2 to 6, the clutch operating member 6 is rotatably fitted with the outer periphery of the cylindrical portion 1h and is also prevented against removal by an engaging pin 19 fixed to the cylindrical portion 1h and by an elongated hole 6c formed in the clutch operating member 6 and extending in the peripheral, circumferential direction thereof.

The clutch cams 6b, 6b are provided on the end face of the clutch operating member 6 in the form of a projection and, as shown in FIG. 2, each of the clutch cams 6b, 6b is formed with a perpendicular surface and an inclined surface which are arranged in the circumferential direction of the clutch operating member 6.

Also, a clutch switch pin 20 is planted on and fixed to the end face of the clutch operating member 6.

In the outer periphery of the clutch operating member 6, there are provided a clutch lever 6a and a projection 6d with which one end of a dead point spring 21 can be engaged.

Rotation preventive pins 22 and 23 are fixed to the outside of the side frame 1b so that the rotational movement of the clutch lever 6a can be restricted within a given range.

The pinion 7 is slidably fitted with a portion of the spool shaft 4 disposed within the reel side plate 11 so that the engaging portion 4a of the spool shaft 4 can be engaged with and disengaged from the engaging portion 7a of the pinion 7 by the clutch cams 6b, 6b, which are rotatable by the clutch operating member 6 to engage the clutch plate 8.

The pinion 7 is in mesh with a drive gear 24 which can be rotated by a handle shaft 25 through a friction plate and a brake plate respectively provided in a drag brake member, and a handle 26 is unrotatably fitted with a handle shaft 25 projected out from the reel side plate 11 and is prevented against removal by a nut 27.

The handle shaft 25 has one end portion which is fitted into a hole formed in the side frame 1b and is prevented against removal by a check plate 28, and the other end portion which is rotatably supported by a bearing 30 mounted to the reel side plate 11 through the cylindrical portion of a drag adjusting knob 29 which is in threaded engagement with the handle shaft 25.

The ratchet wheel 17 is unrotatably fitted with one end side of the handle shaft 25 and the friction plate is in pressure contact therewith. A plurality of kick pins 18 are fixed to the ratchet wheel 17 as shown in FIG. 5.

As shown in FIGS. 4, 5 and 6, a reversal preventive claw 32 held by and between spring plates 31 and 31 is rotatably supported on a shaft 33 and located outside the ratchet wheel 17. The spring plates 31 and 31 hold the two side surfaces of the ratchet wheel 17 therebetween, and the leading end portion of the reversal preventive claw 32 is disposed to face securing teeth formed on the outer periphery of the ratchet wheel 17 in such a manner that the leading end portion is engageable with the securing teeth.

Outside the reversal preventive claw 32, as shown in FIG. 5, there is provided a pin 34 which restricts the rotation of the reversal preventive claw 32.

Outside the ratchet wheel 17, as shown in FIG. 5, the kick lever 9 is rotatably supported by a shaft 35. The kick lever 9 has one end 9a which is located within the rotation area of the kick pins 18, while the other end 9b thereof is so located as to face the clutch switch pin 20 of the clutch operating member 6.

The clutch plate 8 is fitted at the two ends thereof into props 36, 36 fixed to the side frame 1b and is energized by a spring (not shown) in a direction where the engaging portion 4a of the spool shaft 4 is engaged with the engaging portion 7a of the pinion 7.

In the clutch plate 8, as shown in FIGS. 4 and 5, there is formed an arc-shaped recessed portion 8a which is fitted into a groove 7b formed in the pinion 7.

The reel leg is to be fixed to a fishing rod 37.

In FIG. 7, a thumb placing portion 16 is secured to an engaging portion 5c consisting of a pair of recessed portions formed at the upper-most stage in the thumb placement member 5.

The thumb of a hand holding the fishing rod 37 is put on the thumb placing portion 16 of the thumb placement member 5, so that the thumb placement member 5 is pressed down as shown in FIG. 8.

When the thumb placement member 5 is pressed down, then the thumb can be applied to the flange portion 3b or flange portion 3c of the spool 3, so that a thumbing operation to be performed when the fishline 15 is played out can be actually performed.

When the angler likes to apply the thumb to the outer periphery of the fishline 15 wound around the spool, then the thumb placing portion 16 is secured to the engaging portion 5d consisting of a pair of recessed portions formed at the middle stage in the thumb placement member 5 and the thumb is then placed on the thumb placing portion 16.

The securing portion of the thumb placing portion 16 may be selected from the two or more engaging portions 5c, 5d, 5e each consisting of a recessed portions according to the sizes of anglers' hands or according to the winding diameters and winding amounts of the fishline 15 wound around the spool 3.

Now, description will be given below of the operation of the clutch mechanism of the fishing reel. In the clutch-on state in which the engaging portion 4a of the spool shaft 4 is in engagement with the engaging portion 7a of the pinion 7 (see FIGS. 4, 5 and 7), if the handle 26 is rotated, then the pinion is rotated by a drive gear 24 so that the fishline 15 can be wound around the spool 3.

At that time, if the ratchet wheel 17 is rotated clockwise in FIG. 5 through the drive gear 24 and the friction plate, then the spring plates 31, 31 and the reversal preventive pawl 32 are rotated counterclockwise due to friction produced between the ratchet wheel 17 and spring plates 31, 31 to thereby separate the leading end of the reversal preventive pawl 32 from the securing teeth of the ratchet wheel 17, so that the ratchet wheel 17 can be rotated integrally with the drive gear 24.

Next, if the spool 3 is reversely rotated due to the play-out of the fishline, then the drive gear 24 and ratchet wheel 17 are rotated counterclockwise and thus the spring plates 31, 31 and reversal preventive pawl 32 are rotated clockwise, so that the leading end of the reversal preventive claw 32 can be secured to the securing teeth of the ratchet wheel 17.

Next, in the clutch-on state, if the thumb is put on the thumb placing portion 16 of the thumb placement member 5 and the thumb placing portion 16 is pressed down, then the thumb placement member 5 is moved downwardly.

Due to this operation, the clutch operating member 6 is rotated by the clutch lever 6a to thereby rotate the clutch cam 6b, so that the clutch plate 8 can be pushed upwardly.

If the clutch plate 8 is pushed upwardly, then the pinion 7 is moved to release the engagement between the engaging portion 4a of the spool shaft 4 and the engaging portion 7a of the pinion 7, thereby putting the clutch mechanism into the clutch-off state shown in FIG. 6, so that the spool 3 can be freely rotated.

Next, if the handle 26 is rotated, then the ratchet wheel 17 and drive gear 24 are rotated to bring the kick pin 18 into contact with the one end 9a of the kick lever 9, so that the kick lever 9 can be rotated counterclockwise in FIG. 6.

This rotation brings the other end 9b of the kick lever 9 into contact with the clutch switch pin 20 of the clutch operating member 6 to thereby rotate the clutch operating member 6, so that the clutch lever 6a can be moved upwardly.

Since the rotation of the clutch operating member 6 disengages the clutch cam 6b from the clutch plate 8, the pinion 7 is moved to bring the engaging portion 4a of the spool shaft 4 into engagement with the engaging portion 7a of the pinion 7, thereby providing the clutch-on state. Thus, if the handle 26 is rotated, then the pinion 7 and spool shaft 4 are rotated to thereby rotate the spool 3, so that the fishline 15 can be taken up around the spool 3.

If the fishing reel is structured in the above manner, then the securing position of the thumb placing portion 16 can be selected from the two or more engaging portions 5c, 5d, 5e each consisting of a pair of recessed portions formed in the thumb placement member 5 according to the sizes of anglers' hands, the tastes of anglers for the spool operation, and the winding diameters and winding amounts of the fishline 15 to be wound around the spool 3. Therefore, the securing position of the thumb placing portion can be changed easily and thus the spool operation can be performed reasonably with no difficulty, so that the anglers can play fishing under the optimum condition. Also, when playing fishing for a long time, the anglers can play fishing pleasantly and stably.

Figure 9:
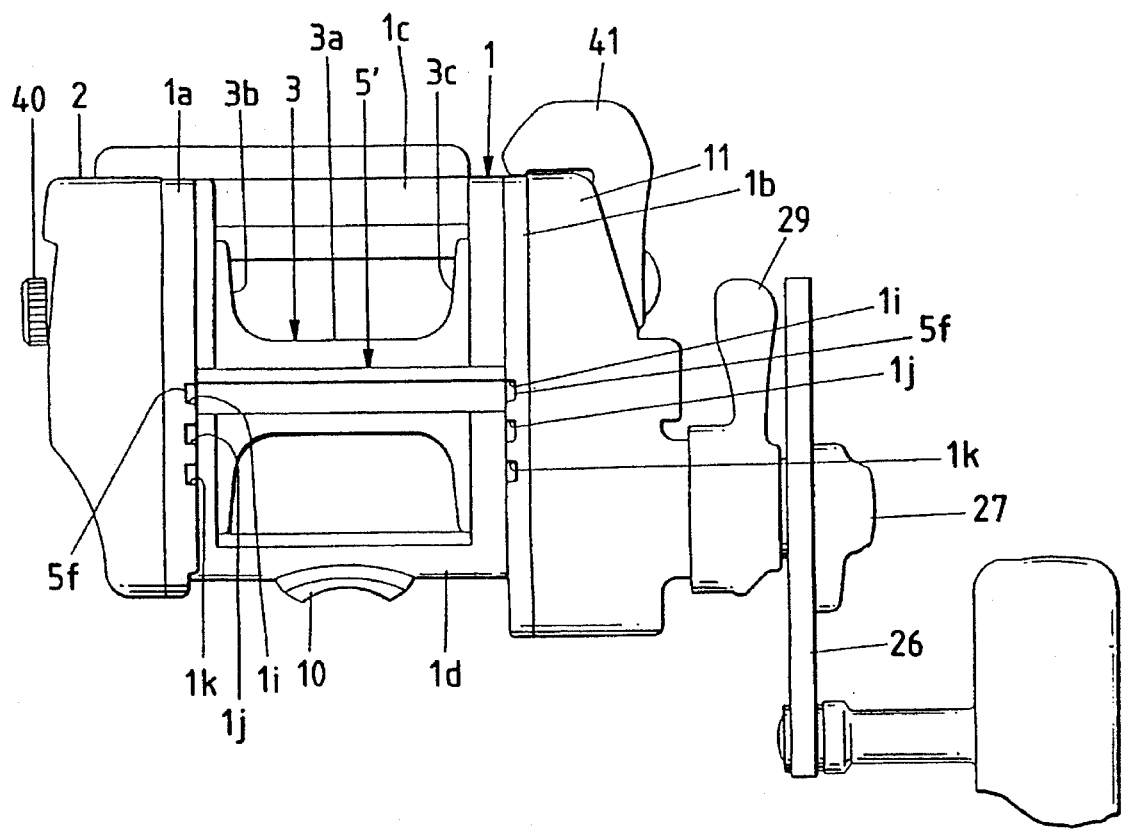
FIG. 9 is a back view of a fishing reel according to a second embodiment of the invention.
Figure 10:
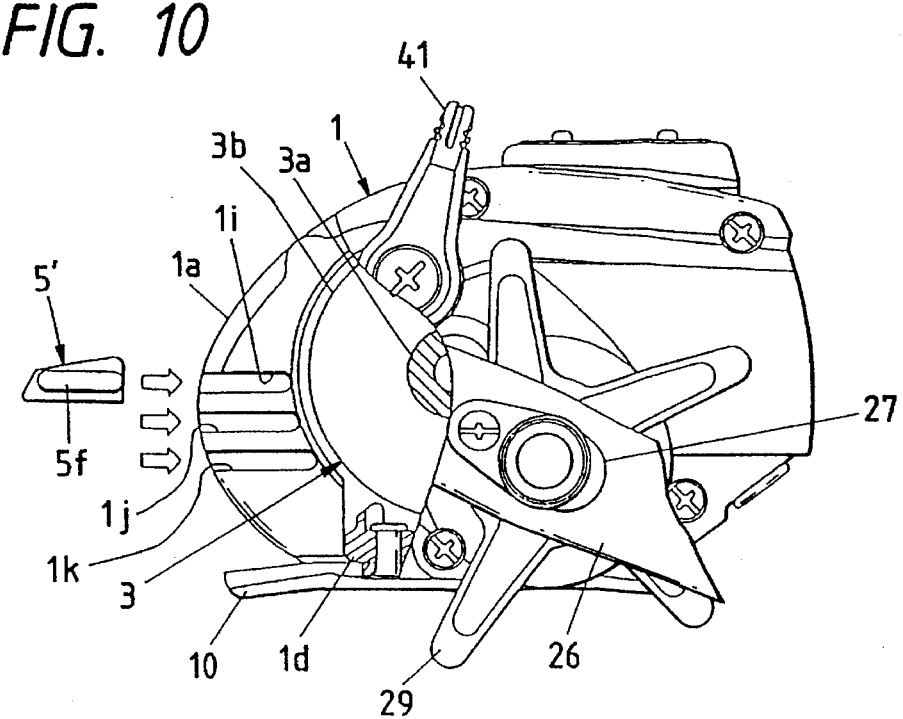
FIG. 10 is a partially broken side view of the fishing reel according to the second embodiment.
Figure 11:
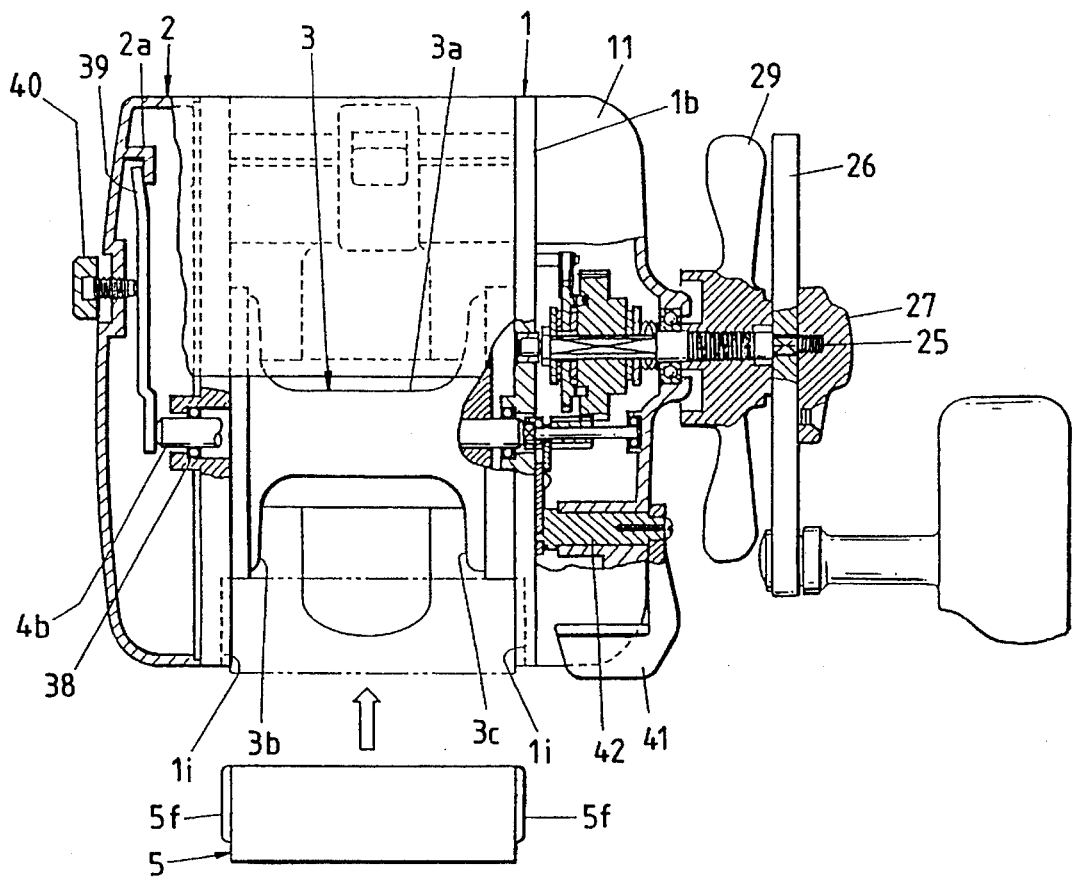
FIG. 11 is a sectional plan view of the main portions of the fishing reel according to the second embodiment.
Figure 12:
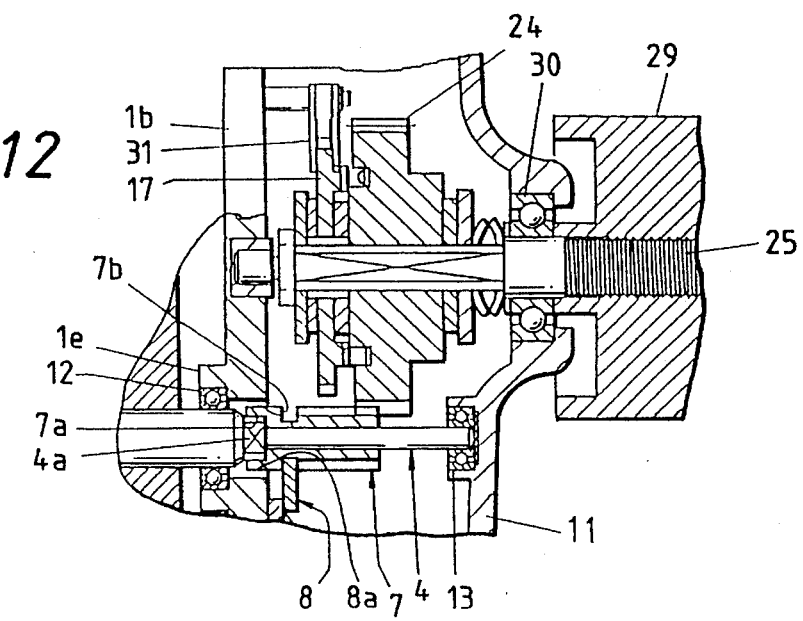
FIG. 12 is an enlarged sectional plan view of the main portions of the fishing reel according to the second embodiment.
Figure 13:
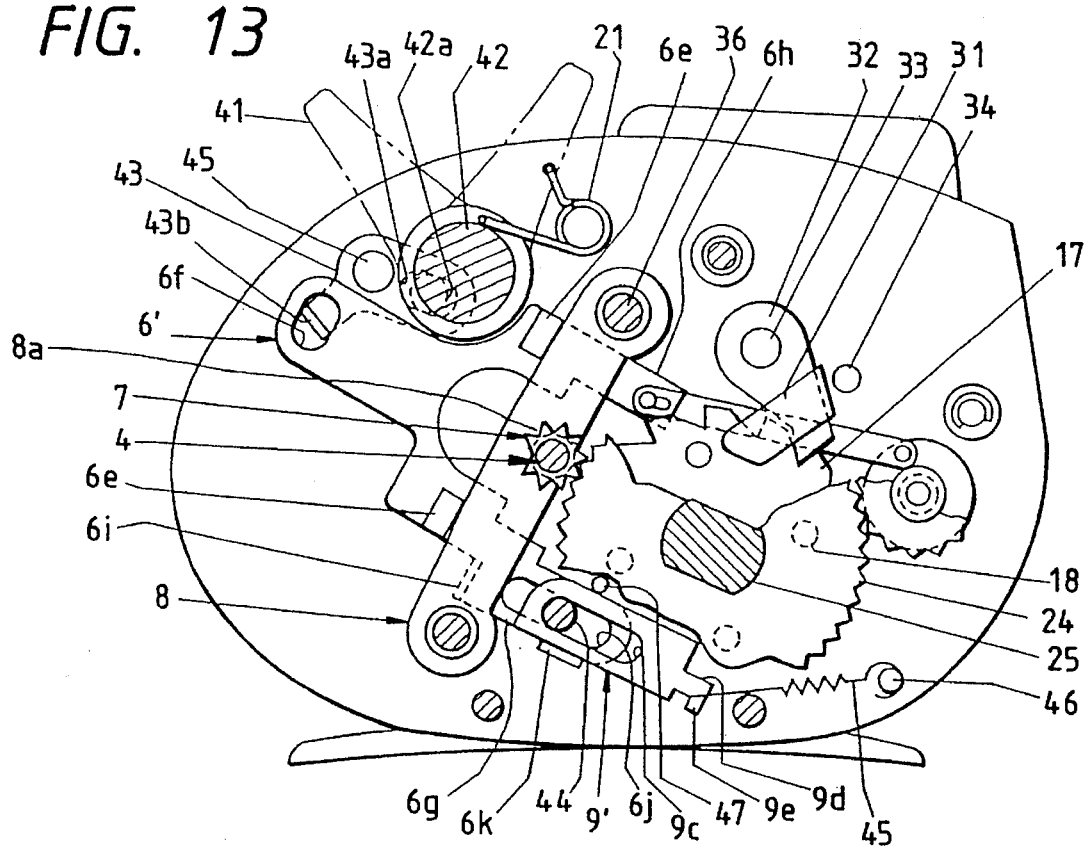
FIG. 13 is a sectional side view of the main portions of a reel main body of the fishing reel according to the second embodiment, showing the clutch-on state of a clutch mechanism provided in a right frame of the reel main body.
Figure 14:
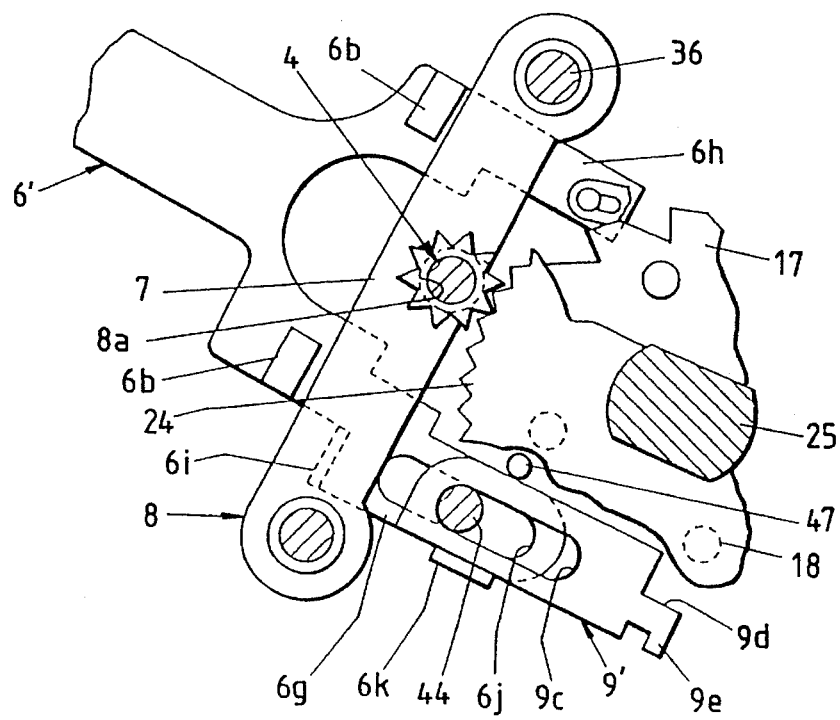
FIG. 14 is an enlarged sectional side view of the main portions of the clutch mechanism shown in FIG. 13.

Now, in FIGS. 9 to 14, there is shown a second embodiment of a fishing reel according to the invention. In particular, FIG. 9 is a back view of the present fishing reel, FIG. 10 is a partially broken side view of the fishing reel, FIG. 11 is a sectional plan view of the main portions of the present fishing reel, FIG. 12 is an enlarged sectional plan view of the main portions of the present fishing reel, FIG. 13 is a sectional side view of the main portions of a clutch mechanism provided on the right side of a reel main body of the present fishing reel, illustrating the clutch-on state of the clutch mechanism, and FIG. 14 is an enlarged sectional side view of the main portions of the clutch mechanism.

In the fishing reel according to the second embodiment, the right and left side frames 1a, 1b and prop 1c of the reel main body 1 as well as the fixed plate 1d of a reel leg 10 are formed integrally with one another so that the right and left side frames 1a and 1b are held parallel to each other.

Reel side plates 2 and 11 are respectively mounted to the outsides of the right and left side frames 1a and 1b.

A spool 3 is rotatably supported between the two side frames 1a and 1b, while a spool shaft 4 fixed to the spool 3 is rotatably supported by a bearing 38 on one side and two bearings 12, 13 on the other side.

The bearing 12 is mounted within a cylindrical portion 1e of the side frame 1b, while the bearing 13 is mounted to the reel side plate 11.

One end of a pressure control lever 39 is in pressure contact with one end 4b of the spool shaft 4 which is projected outwardly of the bearing 38 on one side.

In the portions of the right and left side frames 1a and 1b respectively existing in the rear portion of the reel main body 1, there are formed a plurality of engaging portions 1i, 1j, 1k each consisting of a pair of recessed portions. A thumb placement member 5' includes projecting portions 5f, 5f respectively formed on the two sides thereof. And, the projecting portions 5f, 5f can be mounted into the engaging portions 1i, 1j, 1k in such a manner that the mounting positions thereof can be changed in the vertical direction of the reel main body 1.

The other end of the pressure control lever 39, as shown in FIG. 11, is engaged with a hook portion 2a provided in the reel side plate 2.

The leading end of a control member 40, which is in threaded engagement with the reel side plate 2, is in pressure contact with the central portion of the pressure control lever 39.

As described above, due to the fact that the control member 40 for adjusting the pressure against the end portion of the spool shaft 4 to thereby control the brake force of the spool 3, is located at an arbitrary position of the reel side plate 2 spaced from the spool shaft 4, the degree of freedom of the mounting position of the control member 40 can be increased to eliminate the possibility that the control member 40 obstructs the reel operation, and to facilitate the holdability of the reel and effective use of space within the reel side plate.

Alternatively, the pressure control lever 39 and control member 40 can also be disposed in the other reel side plate 11 located on the handle side.

The spool 3 includes a winding barrel portion 3a and a pair of flange portions 3b, 3c, while a fishline is wound around the winding barrel portion 3a.

The interior of the reel side plate 11 is formed as a gear box, in which there is stored a clutch mechanism that can be operated by a clutch operating member 6'. The clutch operating member 6' can be moved back and forth through a shaft portion 42 and a connecting plate 43 when a clutch lever 41 is rotated.

The clutch mechanism includes an engaging portion 7a formed in a pinion 7 such that it is engageable with and disengageable from the engaging portion 4a of the spool shaft 4, a clutch cam 6e provided in the clutch operating member 6', a clutch plate 8, a plurality of kick pins 18 provided in a ratchet wheel 17, and a kick lever 9'.

The clutch operating member 6', which is slidably provided on the side frame 1b, includes a clutch cam 6e, an engaging portion 6f formed in a transversely extending elongated hole, two extension pieces 6g and 6h respectively forming the two sections of a fork, a bent engaging portion 6i, an elongated hole 6j formed in one extension piece 6g, and a bent portion 6k formed on one side of the extension piece 6g.

A pin 44 fixed to the side frame 1b is fitted into the elongated hole 6j, the kick lever 9' is placed on the extension piece 6g, and the pin 44 is fitted into an elongated hole 9c opened up in the kick lever 9', The kick lever 9' includes a cutaway portion 9d and a spring engaging portion 9e, while one end of a spring 45 is in engagement with the spring engaging portion 9e and the other end of the spring 45 is in engagement with a pin 46 fixed to the side frame 1b.

A securing pin 47 is fixed to the side frame 1b on the other side of the extension piece 6g and the kick lever 9'.

The shaft portion 42 is rotatably supported by the reel side plate 11, the eccentric engaging portion 42a of the shaft portion 42 is in engagement with an elongated hole 43a formed in the connecting plate 43, and the engaging portion 43b of the connecting plate 43 is in engagement with the engaging portion 6f of a transversely elongated hole of the clutch operating member 6'.

A dead point spring 21 is interposed between the shaft portion 42 and side frame 1b.

The connecting plate 43 is rotatably fitted with a shaft portion 45 fixed to the side frame 1b.

The pinion 7 is in mesh with a drive gear 24 which can be rotated by a handle shaft 25 through the friction plate and brake plate of a drag brake member. A handle 26 is fitted with the handle shaft 25 projected from the reel side plate 11 in a rotation preventive manner and is also prevented against removal by a nut 27.

One end of the handle shaft 25 is fitted into a hole formed in the side frame 1b, the other end thereof is rotatably supported by a bearing 30 mounted to the reel side plate 11, and a drag control knob 29 is in threaded engagement with the portion of the handle shaft 25 existing outside of the bearing 30.

A ratchet wheel 17 is fitted with one end side of the handle shaft 25 in a rotation preventive manner and a friction plate is in pressure contact with the ratchet wheel 17. As shown in FIG. 13, a plurality of kick pins 18 are fixed to the ratchet wheel 17.

A reversal preventive pawl 32, which is held by and between spring plates 31, 31, is rotatably supported by a shaft 33 outside the ratchet wheel 17, the spring plates 31, 31 hold the two side surfaces of the ratchet wheel 17 between them, and the leading end of the reversal preventive pawl 32 is so disposed as to face a securing teeth formed in the outer periphery of the ratchet wheel 17 in such a manner that it is freely engageable with the securing teeth.

On the outside of the reversal preventive pawl 32, there is provided a pin 34 against which the reversal preventive pawl 32 strikes when it is rotated.

The clutch plate 8, similarly to the previously described first embodiment, is fitted at the two end portions thereof with props 36, 36 fixed to the side frame 1b and is energized by a spring (not shown) in a direction where the engaging portion 4a of the spool shaft 4 is engaged with the engaging portion 7a of the pinion 7.

The clutch plate 8, as shown in FIGS. 12 and 13, includes an arc-shaped recessed portion 8a which can be fitted into a groove 7a formed in the pinion 7.

In FIG. 9, a thumb placement member 5' is mounted into engaging portions 1i consisting of a pair of recessed portions formed at the upper-most stage in the right and left side frames 1a, 1b existing in the rear portion of the reel main body 1 in such a manner that the mounting position thereof can be changed.

The thumb of one hand holding the fishing rod can be placed on the thumb placement member 5'.

When the thumb of the hand is put on the thumb placement member 5', then the tip of the thumb is applied to a flange portion 3b or 3c of the spool 3 to thereby perform a thumbing operation when a fishline is played out.

If an angler prefers to apply the thumb to the outer periphery of the fishline, then the thumb placement member 5' is removably mounted into engaging portions 1j consisting of a pair of recessed portions formed at the middle stage in the right and left side frames 1a, 1b in such a manner that the mounting position thereof can be changed, and the thumb is then put on the thumb placement member 5'.

That is, according to the sizes of anglers' hands as well as according to the winding diameters and winding amounts of the fishline wound around the spool 3, the mounting position of the thumb placement member 5' can be selected from a plurality of engaging portions 1i, 1j, 1k each consisting of a pair of recessed portions.

Referring now to the operation of the clutch mechanism of the fishing reel, in the clutch-on state in which the engaging portion 4a of the spool shaft 4 is in engagement with the engaging portion 7a of the pinion 7 as shown in FIGS. 12 and 13, if the handle 26 is rotated, then the pinion 7 is rotated by the drive gear 24 so that the fishline can be wound around the spool 3.

In this operation, if the ratchet wheel 17 is rotated clockwise in FIGS. 13 and 14 through the drive gear 24 and the friction plate, then the spring plates 31, 31 and reversal preventive pawl 32 are rotated counterclockwise due to the friction produced between the ratchet wheel 17 and spring plates 31, 31 to thereby part the leading end of the reversal preventive pawl 32 from the securing teeth of the ratchet wheel 17, so that the ratchet wheel 17 can be rotated integrally with the drive gear 24.

Next, if the spool 3 is reversely rotated as the fishline is played out, then the drive gear 24 and ratchet wheel 17 are rotated counterclockwise and the spring plates 31, 31 and reversal preventive pawl 32 are rotated clockwise, so that the leading end of the reversal preventive pawl 32 can be engaged with the securing teeth of the ratchet wheel 17.

After then, if the clutch lever 41 is rotated downwardly or counterclockwise in FIG. 13, then the connecting plate 43 is rotated counterclockwise by the eccentric engaging portion 42a of the shaft portion 42, while the clutch operating member 6 is slid in the right and downward direction by the engaging portion 43b of the connecting plate 43.

With the sliding motion of the clutch operating member 6', the clutch plate 8 is moved upward by the clutch cam 6e to release the engagement between the engaging portion 7a of the pinion 7 and the engaging portion 4a of the spool shaft 4, thereby switching the clutch mechanism over to the clutch-off state, so that the spool 3 can be rotated freely.

When the clutch operating member 6' is slid in the above-mentioned manner, the extension piece 6g is also slid in the right and downward direction in FIGS. 13 and 14. Consequently, the kick lever 9', which has been prevented against rotation by the securing pin 47 and bent portion 6k, is rotated counterclockwise by the spring 45 and the cutaway portion 9d of the kick lever 9' is so situated as to face a position in which it is contactable with the kick pin 18.

Next, if the handle 26 is rotated, then the ratchet wheel 17 and drive gear 24 are rotated clockwise in FIGS. 13 and 14, the kick pin 18 is contacted with the cutaway portion 9d of the kick lever 9' to thereby move the kick lever 9' back in the left direction, the left end of the kick lever 9' pushes up the bent engaging portion 6i of the clutch operating member 6' to thereby move back the clutch operating member 6', the engagement between the clutch cam 6e and clutch plate 8 is released, and the engaging portion 7a of the pinion 7 is engaged with the engaging portion 4a of the spool shaft 4, so that the clutch mechanism is switched over into the clutch-on state.

In the clutch-on state, if the handle 26 is rotated, then the pinion 7 and spool shaft 4 are rotated so that the fishline can be wound around the spool 3.

If the fishing reel is structured in the above manner, then the mounting position of the thumb placement member 5' can be selected from a plurality of engaging portions 1i, 1j, 1k each consisting of a pair of recessed portions according to the sizes of anglers' hands and the preferred spool operations of the anglers as well as according to the winding diameters and winding amounts of the fishline to be wound around the spool 3, so that the mounting position of the thumb placement member 9' can be changed easily. This allows a comfortable spool operation and makes it possible for the anglers to play fishing under the optimum condition. Thus, in fishing for a long time, a fishing operation can be performed in a pleasant and stable condition.

Figure 15:
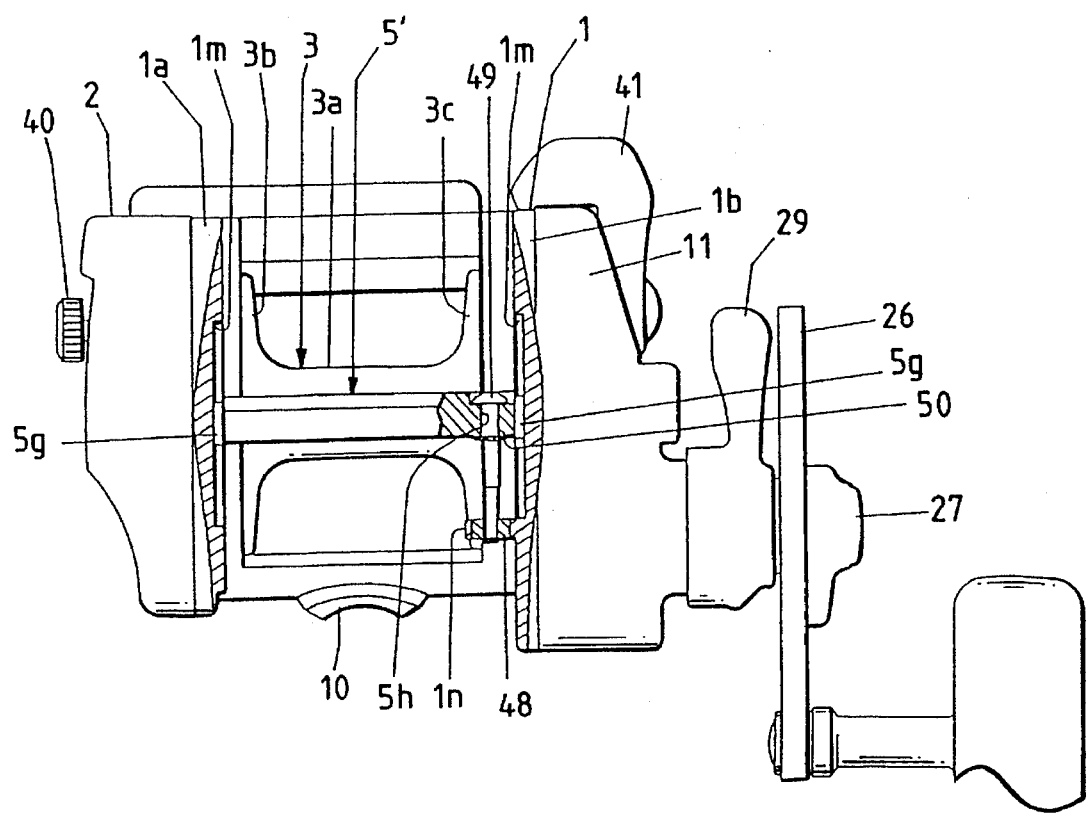
FIG. 15 is a sectional back view of the main portions of a fishing reel according to a third embodiment of the invention.
Figure 16:
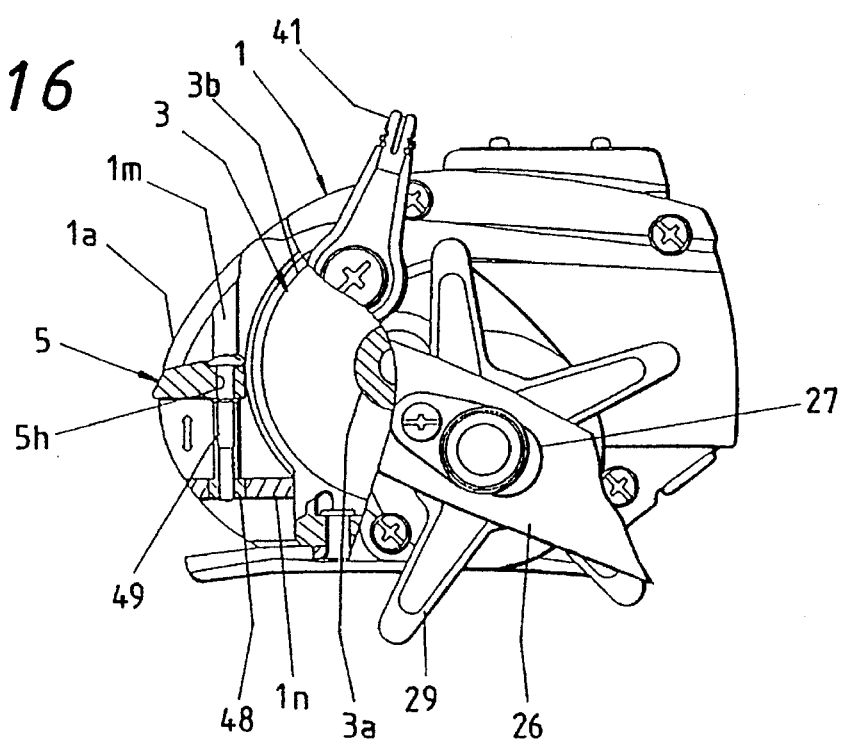
FIG. 16 is a partially broken side view of the fishing reel according to the third embodiment.
Figure 17:
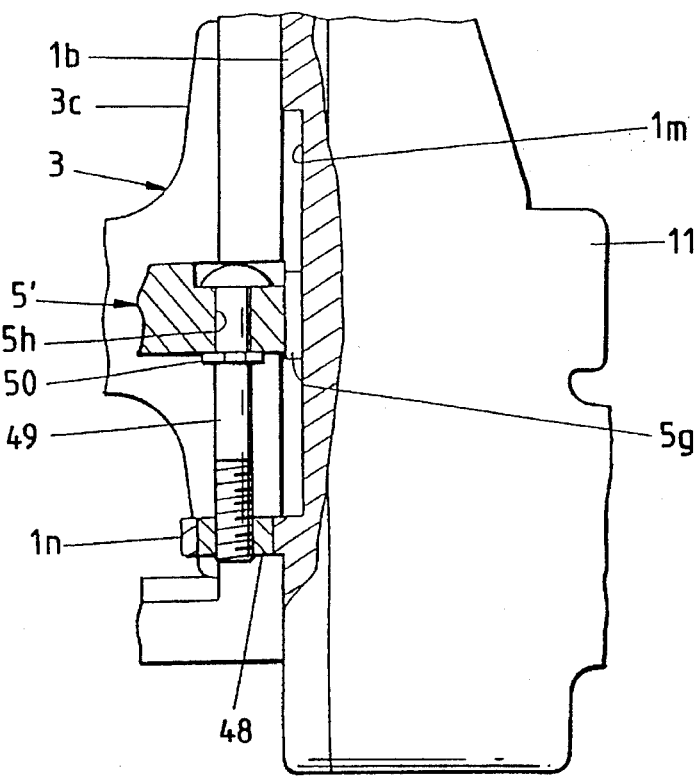
FIG. 17 is an enlarged sectional back view of the main portions of the fishing reel according to the third embodiment.
Figure 18:
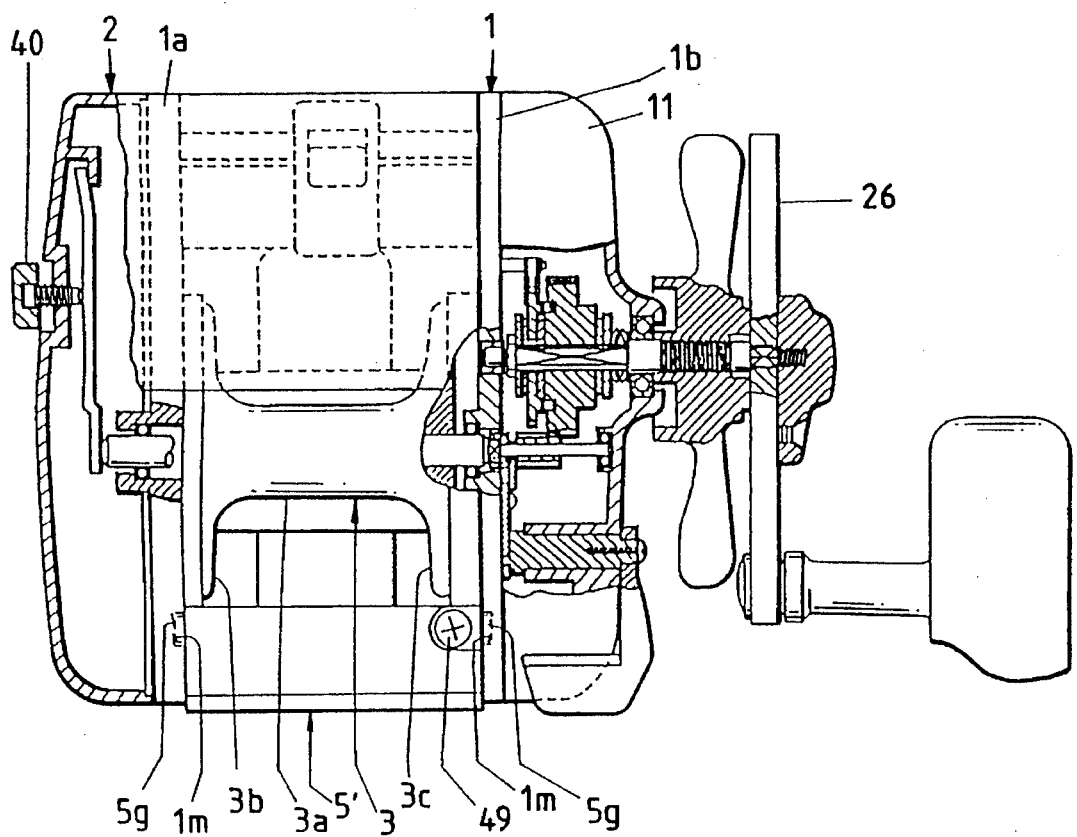
FIG. 18 is a sectional plan view of the main portions of the fishing reel according to the third embodiment.

Now, in FIGS. 15 to 18, there is shown a third embodiment of a fishing reel according to the invention. In particular, FIG. 15 is a sectional back view of the main portions of a fishing reel according to the third embodiment, FIG. 16 is a partially broken side view of the present fishing reel, FIG. 17 is an enlarged sectional back view of the main portions of the present fishing reel, and FIG. 18 is a sectional plan view of the main portions of the present fishing reel.

In the fishing reel according to the third embodiment, similarly to the second embodiment, in the respective portions of the right and left side frames 1a, 1b (which are supported parallel to each other) of the reel main body 1 existing in the rear portion of the reel main body 1, there are formed a pair of recessed grooves 1m in such a manner that the positions of two projecting portions 5g, 5g respectively provided on the two sides of a thumb placement member 5' can be changed in the vertical direction of the reel main body 1.

The side frame 1b includes on the inside thereof a projecting portion 1n in which a nut 48 is embedded.

The thumb placement member 5' included on one side thereof a longitudinally extending through hole 5h into which a screw 49 is inserted. The screw 49 is prevented against removal by an E ring 50, while the lower end of the screw 49 is in threaded engagement with the nut 48.

The screw 49 and nut 48 cooperate in forming threadedly engaging means.

The portion of the screw 49 projected downwardly of the thumb placement member 5' may be covered with a decorative cover.

The remaining portions of the structure of the third embodiment are substantially the same as those of the second embodiment.

In the thumb placement member 5' according to the third embodiment, if the screw 49 is rotated, then the positions of the two projecting portions 5g, 5g respectively provided on the two sides of the thumb placement member 5' are changed in the vertical direction within the pair of recessed grooves 1m.

Figure 19:
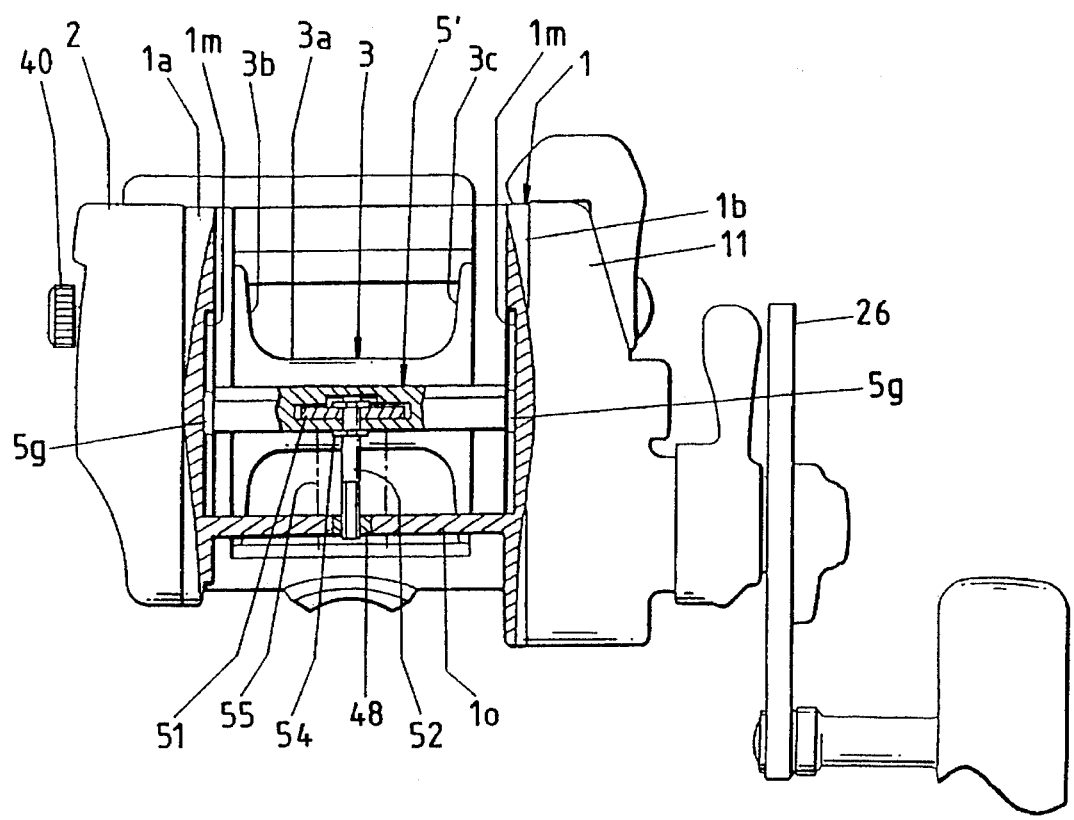
FIG. 19 is a sectional back view of the main portions of a fishing reel according to a fourth embodiment of the invention.
Figure 20:
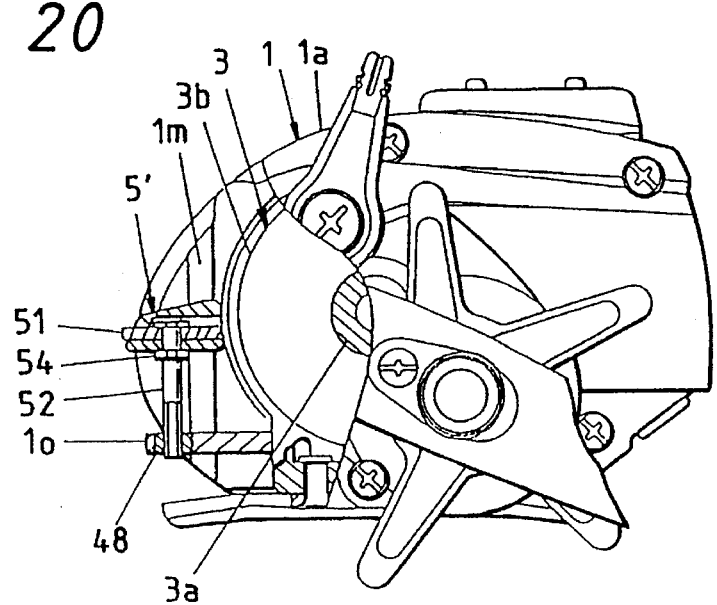
FIG. 20 is a partially broken side view of the fishing reel according to the fourth embodiment.
Figure 21:
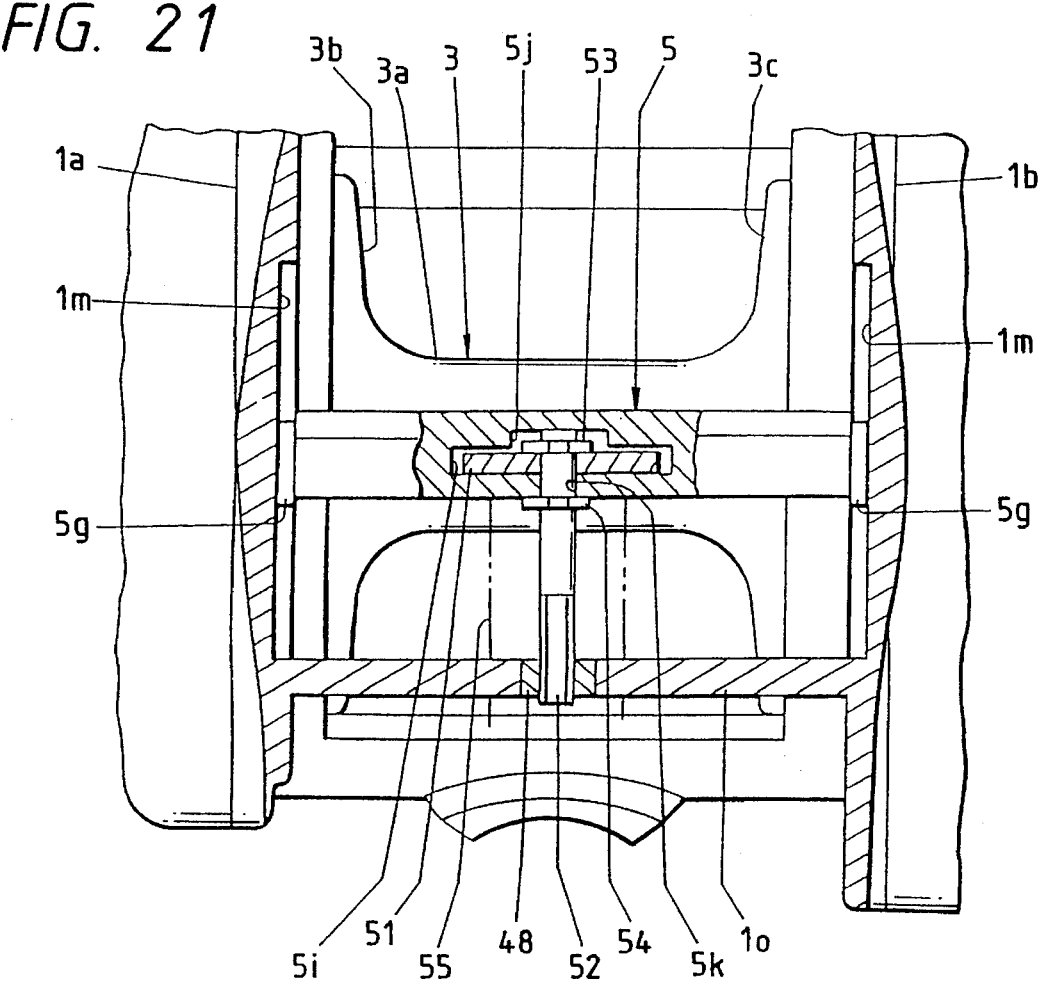
FIG. 21 is a sectional back view of the main portions of the fishing reel according to the fourth embodiment.

Now, in FIGS. 19 to 21, there is shown a fourth embodiment of a fishing reel according to the invention. In particular, FIG. 19 is a sectional back view of the main portions of a fishing reel according to the fourth embodiment, FIG. 20 is a partially broken side view of the present fishing reel, and FIG. 21 is a sectional back view of the main portions of the present fishing reel.

In the fishing reel according to the fourth embodiment, similarly to the second embodiment, in the respective portions of the right and left side frames 1a, 1b (which are supported parallel to each other) of the reel main body 1 existing in the rear portion of the reel main body 1, there are formed a pair of recessed grooves 1m in such a manner that the positions of two projecting portions 5g, 5g provided on the two sides of a thumb placement member 5' can be changed in the vertical direction of the reel main body 1.

A projecting portion 1o is bridged between the right and left side frames 1a, 1b, and a nut 48 is embedded in the projecting portion 1o.

The thumb placement member 5' includes in the transversely central portion thereof a transverse hole 5i relatively wide in the transverse direction and passing through the thumb placement member 5' in a front-to-back direction thereof, a hole 5j formed above the transverse hole 5i and extending from a side of the spool 3, and a through hole 5k formed below the transverse hole 5i.

A control knob 51 is inserted into the transverse hole 5i, a screw 52 which is inserted into the through hole 5k is fixed to a through hole formed in the control knob 51, and E rings 53, 53 are respectively in engagement with the screw 52.

The lower end of the screw 52 is in threaded engagement with the nut 48, and the nut 48 and screw 52 cooperate in forming threadedly engaging means.

The portion of the screw 52 projected downwardly of the thumb placement member 5' may be covered with a decorative cover 55.

The remaining portions of the structure of the fourth embodiment are substantially the same as those of the second embodiment.

In the thumb placement member 5' according to the fourth embodiment, if the screw 52 is rotated by rotating the control knob 51, then the positions of the two projecting portions 5g, 5g respectively formed in the two sides of the thumb placement member 5' can be changed in the vertical direction of the reel main body within the pair of recessed grooves 1m.

Figure 24:
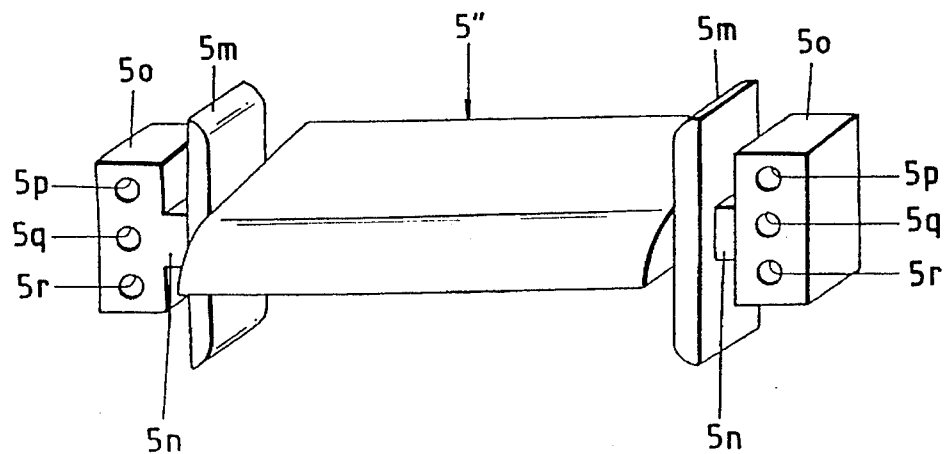
FIG. 24 is a perspective view of a thumb placement member used in the fishing reel according to the fifth embodiment.
Figure 22:
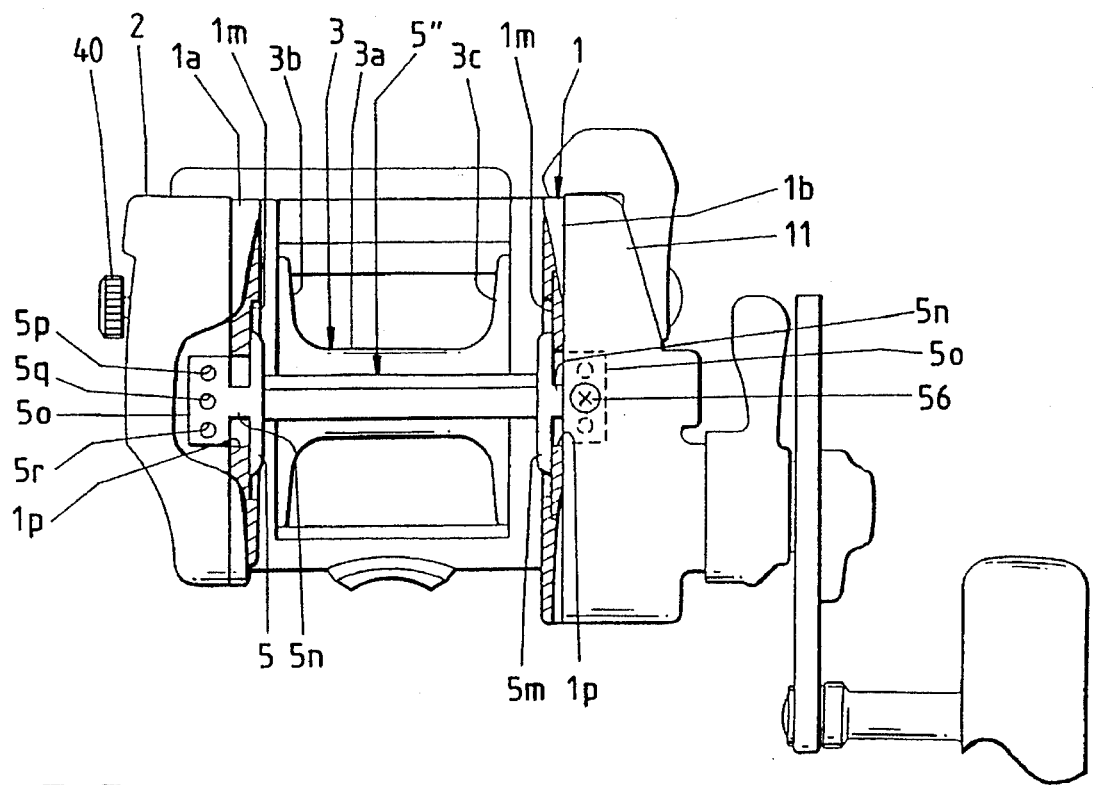
FIG. 22 is a sectional back view of the main portions of a fishing reel according to a fifth embodiment of the invention.
Figure 23:
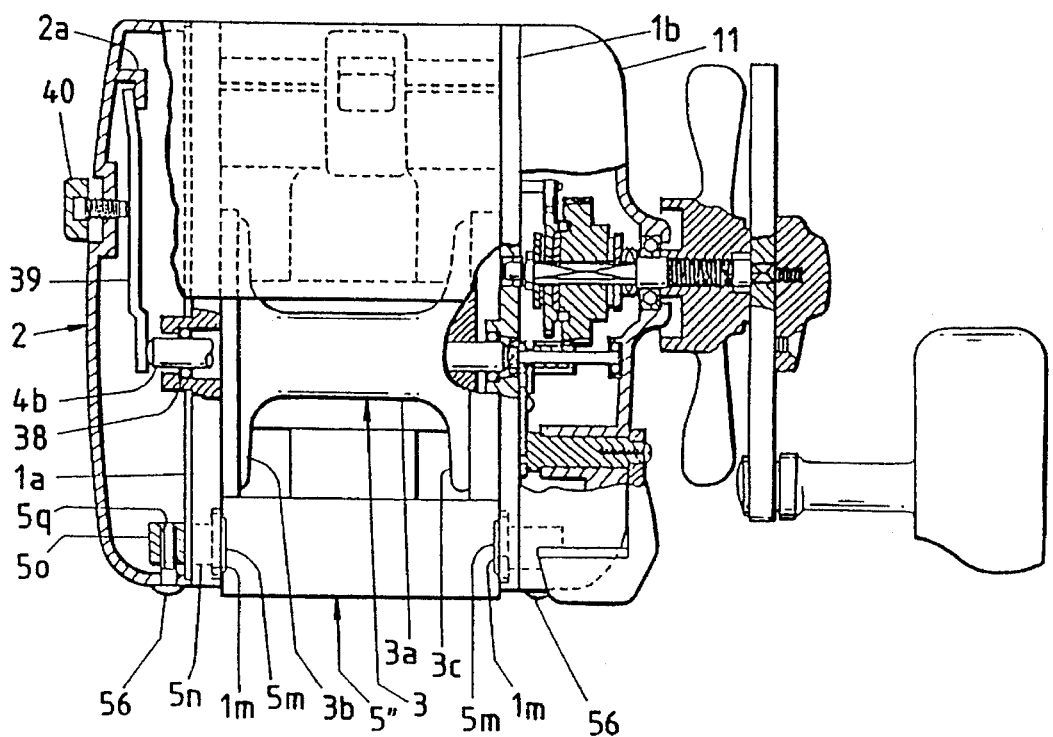
FIG. 23 is a sectional plan view of the main portions of the fishing reel according to the fifth embodiment.

Now, in FIGS. 22 to 24, there is shown a fifth embodiment of a fishing reel according to the invention. In particular, FIG. 22 is a sectional back view of the main portions of a fishing reel according to the fifth embodiment, FIG. 23 is a sectional plan view of the main portions of the present fishing reel, and FIG. 24 is a perspective view of a thumb placement member employed in the fifth embodiment.

In the fishing reel according to the fifth embodiment, similarly to the second embodiment, a pair of recessed grooves 1m are formed in the respective portions of right and left side frames 1a, 1b (which are supported parallel to each other) existing in the rear of a reel main body 1 in such a manner that the positions of a pair of cover portions 5m respectively provided on the two sides of a thumb placement member 5" can be changed in the vertical direction of the reel main body 1.

Further, a pair of elongated holes 1p are formed at the positions of the right and left side frames 1a, 1b corresponding to the pair of recessed grooves 1m.

The thumb placement member 5" includes a projecting portion 5n and a securing portion 5o which are respectively provided outside the pair of cover portions 5m, while a plurality of screw holes 5p, 5q, 5r are opened up in the securing portion 5o.

The reel side plates 2 and 11 respectively include through holes into which a screw 56 can be inserted.

The screw holes 5p, 5q, 5r and screw 56 cooperate in forming shift and hold means.

To change the vertical position of the thumb placement member 5", the thumb placement member 5" may be shifted in the vertical direction and the screw 56 may be threadedly engaged with one of the screw holes 5p, 5q, 5r.

Figure 25:
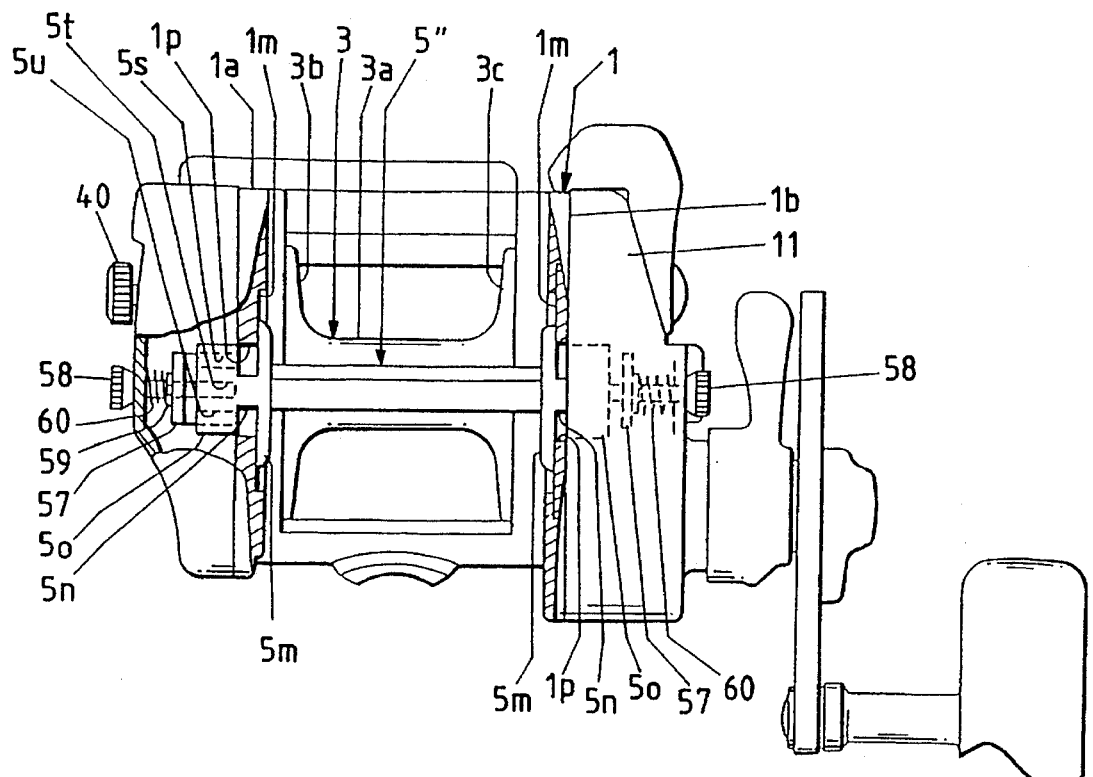
FIG. 25 is a sectional back view of the main portions of a fishing reel according to the sixth embodiment of the invention.
Figure 26:
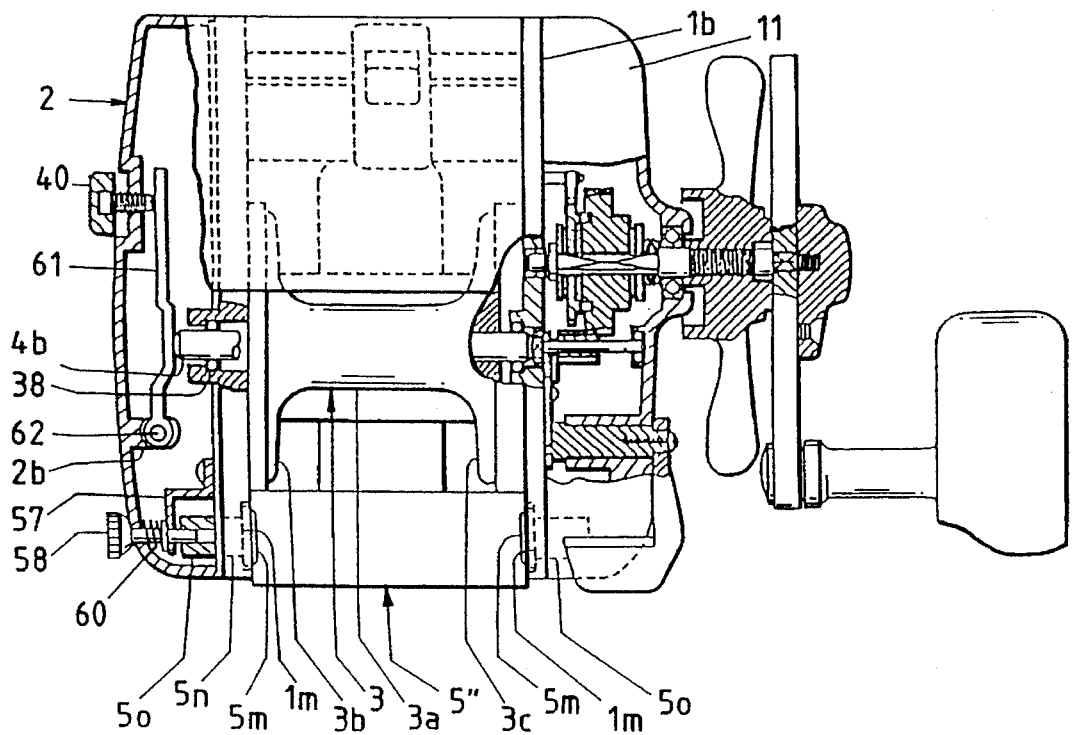
FIG. 26 is a sectional plan view of the main portions of the fishing reel according to the sixth embodiment.

Now, in FIGS. 25 and 26, there is shown a sixth embodiment of a fishing reel according to the invention. In particular, FIG. 25 is a sectional back view of the main portions of a fishing reel according to the sixth embodiment, and FIG. 26 is a sectional plan view of the main portions of the present fishing reel.

In the fishing reel according to the sixth embodiment, similarly to the second embodiment, in the respective portions of the right and left side frames 1a, 1b (which are supported parallel to each other) of the reel main body 1 existing in the rear of the reel main body 1, there are formed a pair of recessed grooves 1m in such a manner that the positions of a pair of cover portions 5m respectively provided on the two sides of a thumb placement member 5" can be changed in the vertical direction of the reel main body 1.

Further, there are formed a pair of elongated holes 1p in the right and left side frames 1a, 1b at the positions thereof corresponding to the pair of recessed grooves 1m.

The thumb placement 5" further includes a projecting portion 5n and a securing portion 5o which are provided respectively outside the each of the cover portions 5m, and a plurality of holes 5s, 5t, 5u are so opened up in the securing portion 5o as to extend in the longitudinal direction thereof.

Two L-shaped hold plates 57 (see FIG. 26) are respectively fixed to the outsides of the right and left side frames 1a, 1b. Each of the hold plates 57 includes a through hole, and the leading end of a adjusting pin 58 is inserted into the through hole of the hold plate 57.

In the side surfaces of the reel side plates 2, 11, there are formed through holes into which the adjusting pins 58 can be inserted, E rings 59 are respectively secured to the adjusting pins 58, and a spring 60 are fitted respectively between each of the side plates 2, 11 and the E ring 59.

The holes 5s, 5t, 5u and adjusting pins 58 cooperate in forming shift and hold means.

In FIG. 26, the intermediate portion of a pressure control lever 61 having a different shape is in pressure contact with one end 4b of the spool 4 projected outwardly from one of bearings 38 supporting one side of the spool shaft 4.

One end of the pressure control lever 61 is supported by a prop 2b formed in the reel side plate 2 in such a manner that it is swingable about a shaft 62.

The leading end of a control member 40 in threaded engagement with the reel side plate 2 is in pressure contact with the other end of the pressure control lever 61.

To change the vertical position of the thumb placement member 5", the thumb placement member 5" may be moved in the vertical direction and the leading ends of the thumb pins 58 may be inserted into one of the holes 5s, 5t, 5u.

In the foregoing description, the reel main body 1 is structured in such a manner that the right and left side frames 1a, 1b, prop 1c, and fixing plate 1d are formed integrally with one another. However, this is not limitative, but they may be formed separately from one another and the right and left side frames 1a, 1b may be held parallel to each other.

Also, in the foregoing description, the handle 26 is provided on the right side of the reel main body 1. However, the invention is not limited to this but, alternatively, the handle may be provided on the left side of the reel main body 1.

When the invention is structured in the above manner, then the mounting position of the thumb placement member can be selectively set according to the sizes of anglers' hands and the preferred spool operations of anglers as well as according to the winding diameters and winding amounts of the fishline to be wound around the spool, that is, the position of the thumb placement member can be changed easily. This permits a comfortable and smooth spool operation and thus allows the anglers to play fishing under the optimum conditions. Further, in fishing to be played for a long time, the anglers can enjoy fishing pleasantly and stably.

What is claimed is:

1. A fishing reel comprising:

a reel main body having a pair of side plates;

a spool rotatably supported between said side plates;

a clutch mechanism for switching said spool between a spool free state and a winding state;

a movable thumb placement member connected to said clutch mechanism so that said clutch mechanism is operated by movement of said thumb placement member to switch said spool between said spool free state and said winding state, said thumb placement member having a thumb placement portion located to receive a thumb of an angler thereon; and a means for selectively positioning said thumb placement portion in one of a plurality of relative positions with respect to said thumb placement member while maintaining said spool in said winding state.

2. A fishing reel according to claim 1, wherein said movable thumb placement member includes a first member supported on and movable relative to said side plates for operating said clutch mechanism to switch said spool between said spool free state and said winding state, and said thumb placement portion being removably mounted to a selected one of a plurality of relative positions with respect to said first member.

3. A fishing reel as set forth in claim 1, wherein said thumb placement member is provided backwardly of said spool.

4. A fishing reel as recited in claim 1, wherein said thumb placement member comprises:

a u-shaped member having a pair of opposing walls each having an inner surface facing one another, each of said inner surfaces are formed with a plurality of recesses; wherein, said thumb placement portion is disposed in one of said recesses, said thumb placement portion being selectively positioned by changing the recess in which said thumb placement portion is disposed.

5. A fishing reel as recited in claim 1, wherein said thumb placement member comprises:

a plurality of adjustment pins; and a pair of side frames each having a plurality of bores to receive one of said pins;

said thumb placement portion having two ends each having a plurality of bores extending therethrough, wherein said thumb placement portion member is selectively positioned by aligning said thumb placement portion in a desired position such that one of said bores on each end of said thumb placement portion is aligned with one of said bores of said side frames, and one of said pins is disposed in each of said aligned bores to secure said thumb placement portion to said side frames.

6. A fishing reel comprising:

a reel main body;

a spool supported by said reel main body;

a wind-up mechanism rotatable for winding a fishline onto said spool when said spool is in a winding state;

a thumb placement member adapted to receive a thumb of an angler thereon, and rigidly mounted to said reel main body; and a means for selectively positioning said thumb placement member in one of a plurality of relative positions with respect to said reel main body.

7. A fishing reel as set forth in claim 6, wherein said means for selectively positioning includes plural pairs of engaging portions formed on said reel main body and aligned in a vertical direction of said reel main body, said thumb placement portion being removably mounted to said thumb placement member through selected one of plural pairs of engaging portions.

8. A fishing reel as set forth in claim 6, wherein said means for selectively positioning includes male and female threads threadingly engaged with each other for moving said thumb placement portion in a vertical direction with respect to said reel main body.

9. A fishing reel as set forth in claim 6, wherein said means for selectively positioning includes a guide for allowing movement of said thumb placement portion relative to said reel main body, and a pin and hole means for retaining said thumb placement member at a selected one of a plurality of discrete positions.

10. A fishing reel as set forth in claim 6, further comprising:

a clutch mechanism for switching said spool from said winding state to a spool free state.

11. A fishing reel as set forth in claim 6, wherein said thumb placement member is provided backwardly of said spool.

12. A fishing reel as recited in claim 6, wherein said thumb placement member comprises:

a bore extending therethrough; and a screw rotatably supported in said bore having a threaded portion extending therethrough; said reel main body having:

a projecting portion having a threaded recess to receive said threaded portion of said screw;

wherein said thumb placement member is selectively positioned by rotating said screw to vary a distance between said thumb placement member and said projecting portion.

* * * * *